United States Patent [19]

Gal

[11] Patent Number: 5,289,006
[45] Date of Patent: Feb. 22, 1994

[54] THERMAL IMAGING APPARATUS

[75] Inventor: Eli Gal, Ramat Gan, Israel

[73] Assignee: Allied Signal Inc., Morris Township, N.J.

[21] Appl. No.: 951,285

[22] Filed: Sep. 25, 1992

[30] Foreign Application Priority Data

Sep. 27, 1991 [IL] Israel ..................... 99592

[51] Int. Cl.⁵ ........................................... H01L 31/00
[52] U.S. Cl. ................................. 250/334; 250/338.4
[58] Field of Search .............................. 250/338.4, 334

[56] References Cited

U.S. PATENT DOCUMENTS

| 3,995,159 | 11/1976 | Elliott | 250/370 |
| 4,347,530 | 8/1982 | Stetson | 358/113 |
| 4,572,953 | 2/1986 | Elliott et al. | 250/338.4 |
| 4,679,063 | 7/1987 | White | 257/187 |
| 4,691,107 | 9/1987 | Elliott et al. | 250/370.13 |
| 4,883,962 | 11/1989 | Elliott | 250/334 |

FOREIGN PATENT DOCUMENTS

| 2819056 | 11/1979 | Fed. Rep. of Germany | 250/334 |
| 39389 | 5/1975 | Israel |  |
| 2-154123 | 6/1990 | Japan | 250/334 |
| 2119508 | 11/1983 | United Kingdom |  |
| 2127619 | 4/1984 | United Kingdom |  |
| 2165120 | 4/1986 | United Kingdom | 250/334 |

OTHER PUBLICATIONS

C. T. Elliott, D. Day and D. J. Wilson; "An Integrating Detector For Serial Scan Thermal Imaging"; *Infrared Physics;* pp. 31–42 vol. 22, 1982.

*Primary Examiner*—Constantine Hannaher
*Attorney, Agent, or Firm*—Verne E. Kreger, Jr; Howard G. Massung

[57] ABSTRACT

Thermal imaging apparatus including a non-linear optomechanical scanner receiving light from a scene and directing it onto an image plane, the scanner defining a non-linear scan velocity in the image plane, a SPRITE detector disposed in the image plane and including first and second spaced contacts and apparatus for applying a bias voltage across said contacts, and apparatus for varying the bias voltage across the contacts as a function of the non-linear scan velocity, thereby to compensate for the non-linearity of the optomechanical scanner.

20 Claims, 2 Drawing Sheets

THERMAL IMAGING APPARATUS

FIELD OF THE INVENTION

The present invention relates to thermal imaging apparatus generally and more particularly to thermal imaging apparatus employing non-linear scanning.

BACKGROUND OF THE INVENTION

Various types of thermal imaging devices are known in the art. These include staring arrays, parallel scan devices and serial scan devices. Serial scan devices which employ a plurality of detectors arranged in a linear array and interconnected to provide time delay and integration are described in the Laakmann Patent, Israel Patent 39,389.

There is described in an article entitled "An Integrating Detector for Serial Scan Thermal Imaging, by C. T. Elliott, et al, Infrared Physics, Vol 22, pp 31–42, 1982, the use of a Mercury Cadmium Telluride "SPRITE" detector for thermal imaging. The SPRITE detector is operative to perform time delay and integration within the detector material itself.

The SPRITE detector itself is described in U.K. Patents 2119508, published Oct. 26, 1983, and 2127619 published on Apr. 11, 1984 and in U.S. Pat. Nos. 4,572,953; 4,679,063 and 4,691,107.

One disadvantage in the use of the SPRITE detector in a scanning thermal imaging device is that the scan velocity across the detector is non-linear. Accordingly, the time delay and integration provided by the SPRITE detector involves a corresponding inaccuracy.

SUMMARY OF THE INVENTION

The present invention seeks to provide improved thermal imaging apparatus employing a SPRITE detector.

There is thus provided in accordance with a preferred embodiment of the present invention, thermal imaging apparatus including a non-linear optomechanical scanner receiving light from a scene and directing it onto an image plane, the scanner defining a non-linear scan velocity in the image plane, a SPRITE detector disposed in the image plane and including first and second spaced contacts and apparatus for applying a bias voltage across said contacts, and apparatus for varying the bias voltage across the contacts as a function of the non-linear scan velocity, thereby to compensate for the non-linearity of the optomechanical scanner.

In accordance with a preferred embodiment of the present invention, the apparatus for varying comprises a feedback loop coupled to the scanner.

Alternatively, the apparatus for varying may comprise a buffer memory of any suitable configuration, such as a ROM or look up table (LUT). Preferably the operation of such a buffer memory is synchronized with the motion of the scanner.

There is also provided scanning apparatus comprising:

a non-linear optomechanical scanner receiving light from a scene and directing it onto an image plane, said scanner defining a non-linear scan velocity in the image plane;

an elongate detector disposed in said image plane and including apparatus for performing time delay and integration therealong and apparatus for controlling the rate of time delay and integration;

apparatus for varying the rate of time delay and integration of said elongate detector as a function of the non-linear scan velocity, thereby to compensate for the non-linearity of the optomechanical scanner.

In accordance with a preferred embodiment of the present invention, the apparatus is suitable for use for scanning in either of two opposite directions and includes means for selectably switching the polarity of the bias voltage across said contacts.

In such a case, apparatus is provided for selectably obtaining an output signal at a selected end of said SPRITE detector in accordance with the desired direction of scanning.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
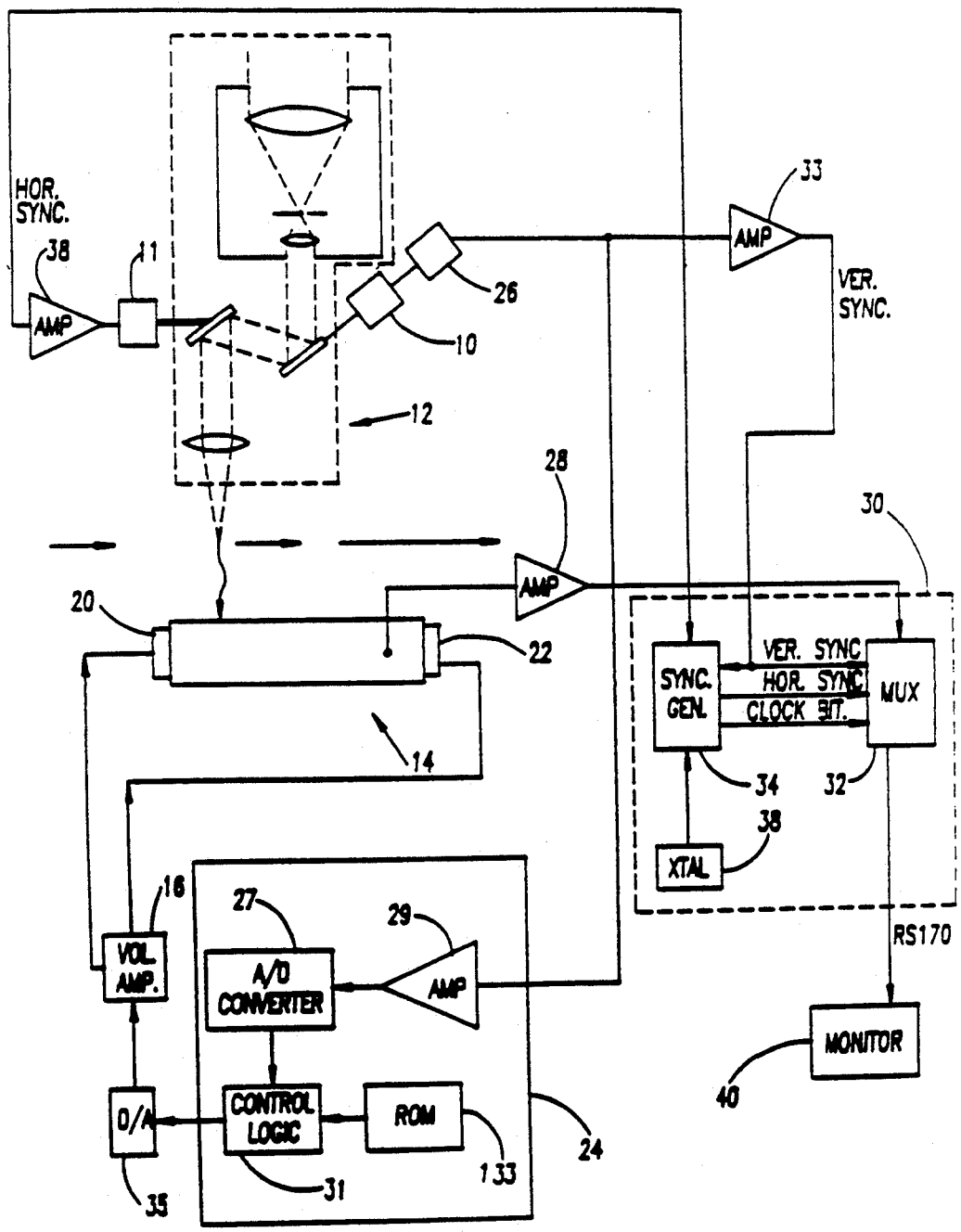
FIG. 1 is a simplified partially block diagram, partially schematic illustration of thermal imaging apparatus constructed and operative in accordance with a preferred embodiment of the present invention.

Reference is now made to FIG. 1, which illustrates a preferred embodiment of a scanner, such as that useful in a thermal imager, constructed and operative in accordance with the present invention. The apparatus of FIG. 1 constitutes a FLIR, it being appreciated that the present invention is not limited to FLIRs but is applicable to any suitable type of scanner, such as one employed, for example, in medical imaging or in a scanning thermal imager.

An optomechanical vertical scanner 10 and an optomechanical horizontal scanner 11, such as is described in U.S. Pat. No. 4,347,530 to Stetson, entitled Scanning Mirror Arrangement, the disclosure of which is hereby incorporated by reference, view a scene and optically direct an image of the scene via suitable scanning optics 12 onto a SPRITE detector 14.

The term "SPRITE detector" is used throughout to designate an elongate detector which performs time delay and integration along its length. Preferred SPRITE detectors are described in the publications set forth hereinabove in the Background of the Invention, which publications are hereby incorporated herein by reference. Suitable SPRITE detectors are commercially available from Mullard of the U.K. and are described inter alia in the above-mentioned article by Elliot et al, the disclosure of which is hereby incorporated by reference.

As is well known, the time constant of the time delay and integration performed by the SPRITE detector is controlled by the bias voltage applied thereacross, which may be controlled by the output of a voltage amplifier 16, such as a Motorola 741, connected across opposite terminals 20 and 22 of the SPRITE detector 14.

In accordance with a preferred embodiment of the present invention, means are provided for varying the bias voltage across terminals 20 and 22 of the SPRITE detector in a non-linear manner so as to match and thus compensate for the non-linearity of the scan velocity of the image across the detector.

In the illustrated embodiment, a voltage variation controller 24 operates voltage amplifier 16 to vary the bias voltage across terminals 20 and 22 in response to control inputs from a vertical scanning velocity indicator 26.

Typically the voltage variation controller 24 comprises an A/D converter 27 which receives the output from scanning velocity indicator 26 via an amplifier 29. The output from converter 27 is supplied to control logic circuitry 31, typically including an Intel 8051 chip which is operative for every received velocity indication to draw from a ROM 133, a suitable compensation value which is supplied via a digital to analog converter, to voltage amplifier 16.

Vertical scanning velocity indicator 26 may comprise an encoder, such as a series HEDS-5000 encoder manufactured and sold by Hewlett Packard of the U.S.A., which is coupled to a high speed scanning mirror and senses its position in real time. Alternatively indicator 26 may comprise a line CCD which senses a light source such as an LED mounted on the scanning mirror. As a further alternative, indicator 26 may comprise a current detector which senses the current in a galvanometer or motor which drives the scanning mirror. As a further alternative, a pre-measured indication of non-linearity of the scanning may be employed, in the form of a look up table or any other suitable medium.

The output of detector 14 is supplied via an amplifier 28, such as an output amplifier, to a video processor 30. Video processor 30 comprises a multiplexer 32 which receives an input from amplifier 28 and also receives a vertical sync input from indicator 26 via an amplifier 33 and a horizontal sync input and clock bit from a sync generator 34. Sync generator 34 receives an oscillator input from a crystal oscillator, a horizontal sync input from horizontal scanner 11 via an amplifier 38 and a vertical sync input from indicator 26. The output of multiplexer 32 may be supplied as a RS 170 standard signal to a monitor 40 or other utilization apparatus.

Figure 2:
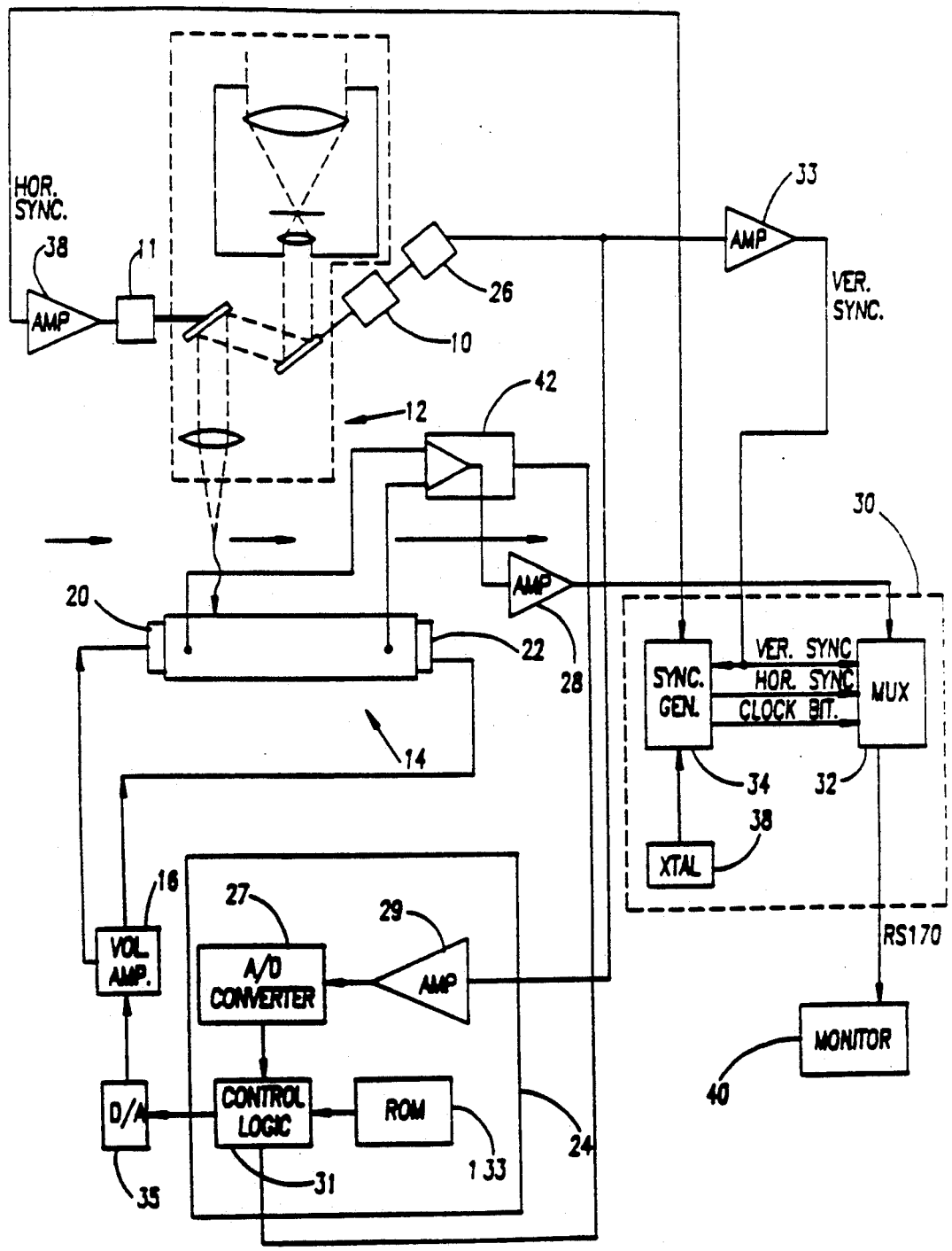
FIG. 2 is a simplified partially block diagram, partially schematic illustration of thermal imaging apparatus constructed and operative in accordance with another preferred embodiment of the present invention.

Reference is now made to FIG. 2, which illustrates another preferred embodiment of the invention which is suitable for scanning of the SPRITE detector in two opposite directions along its axis. The apparatus is essentially identical to that of FIG. 1 other than in that provision is made for applying the bias voltage across the SPRITE detector alternatively in opposite directions.

Here control logic circuitry 31 is operative to provide switching inputs to a two pole controllable switch 42, such as an AD 7512 DITQ 883B from Analog Devices, which selects from which end of SPRITE detector 14 an output is supplied to amplifier 28. The selection of which end of SPRITE detector 14 is employed for the output is coordinated with the vertical scan direction. Control logic circuitry 31 is operative also to switch the polarity of the bias voltage applied to the ends of the SPRITE detector 14 via the voltage amplifier 16 to correspond to the selection of the output of the SPRITE detector and the direction of scan.

It is appreciated that the present invention is operative with both focussing and non-focussing optics. The present invention is operative to correct any measurable non-linear motion across the detector axis. The invention is applicable both to serial detector arrangements and to serial-parallel detector arrangements, wherein a plurality of serial detectors are connected in parallel.

It is appreciated that the designations of vertical and horizontal are arbitrary and may be interchanged or used to refer to any arbitrary directions.

It will be appreciated by persons skilled in the art that the present invention is not limited by what has been particularly shown and described hereinabove. Rather the scope of the present invention is defined only by the claims which follow:

I claim:

1. Scanning apparatus comprising:
    a non-linear optomechanical scanner receiving light from a scene and directing it onto an image plane, said scanner defining a non-linear scan velocity in the image plane;
    a SPRITE detector disposed in said image plane and including first and second spaced contacts and means for applying a bias voltage across said contacts;
    means for sensing the velocity of the scanner in real time as it scans across the image plane; and
    means for dynamically varying the bias voltage across said contacts as a function of the sensed non-linear scan velocity, thereby to compensate for the non-linearity of the optomechanical scanner.

2. Apparatus according to claim 1 and wherein said means for varying comprises a feedback loop coupled to the scanner.

3. Apparatus according to claim 1 and wherein said means for varying comprises a buffer memory.

4. Scanning apparatus comprising:
    a non-linear optomechanical scanner receiving light from a scene and directing it onto an image plane, said scanner defining a non-linear scan velocity in the image plane;
    an elongate detector disposed in said image plane and including means for performing time delay and integration therealong and means for controlling the rate of time delay and integration;
    means for sensing the velocity of the scanner in real time as it scans across the image plane; and
    means for dynamically varying the rate of time delay and integration of said elongate detector as a function of the sensed non-linear scan velocity, thereby to compensate for the non-linearity of the optomechanical scanner.

5. Scanning apparatus comprising:
    a non-linear optomechanical scanner receiving light from a scene and directing it onto an image plane, said scanner defining a non-linear scan velocity in the image plane;
    a SPRITE detector disposed in said image plane and including first and second spaced contacts and means for applying a bias voltage across said contacts;
    means for sensing the velocity of the scanner in real time as it scans across the image plane; and
    means for dynamically varying the bias voltage across said contacts as a function of the sensed non-linear scan velocity, thereby to compensate for the non-linearity of the optomechanical scanner; and
    wherein said apparatus is suitable for use for scanning in either of two opposite directions and includes means for selectably switching the polarity of the bias voltage across said contacts.

6. Apparatus according to claim 5 and also comprising means for selectably obtaining an output signal at a selected end of said SPRITE detector in accordance with the desired direction of scanning.

7. Apparatus according to claim 5 and wherein said means for varying comprises a buffer memory.

8. Apparatus according to claim 5 and wherein said means for varying comprises a feedback loop coupled to the scanner.

9. Scanning apparatus comprising:
a non-linear optomechanical scanner receiving light from a scene and directing it onto an image plane, said scanner defining a non-linear scan velocity in the image plane;
an elongate detector disposed in said image plane and including means for performing time delay and integration therealong and means for controlling the rate of time delay and integration;
means for sensing the velocity of the scanner in real time as it scans across the image plane; and
means for dynamically varying the rate of time delay and integration of said elongate detector as a function of the sensed non-linear scan velocity, thereby to compensate for the non-linearity of the optomechanical scanner, and
wherein said apparatus is suitable for use for scanning in either of two opposite directions.

10. Apparatus according to claim 9 and also comprising means for selectably obtaining an output signal at a selected end of said detector in accordance with the desired direction of scanning.

11. Scanning apparatus comprising:
a non-linear optomechanical scanner receiving light from a scene and directing it onto an image plane, said scanner defining a non-linear scan velocity in the image plane;
a SPRITE detector disposed in said image plane and including first and second spaced contacts and means for applying a bias voltage across said contacts;
a memory providing a pre-measured indication of non-linearity of the scanner and whose output is synchronized with the motion of the scanner;
means for varying the bias voltage across said contacts as a function of the non-linear scan velocity, thereby to compensate for the non-linearity of the optomechanical scanner.

12. Apparatus according to claim 11 and wherein said means for varying comprises a feedback loop coupled to the scanner.

13. Apparatus according to claim 11 and wherein said means for varying comprises a buffer memory.

14. Scanning apparatus comprising:
a non-linear optomechanical scanner receiving light from a scene and directing it onto an image plane, said scanner defining a non-linear scan velocity in the image plane;
an elongate detector disposed in said image plane and including means for performing time delay and integration therealong and means for controlling the rate of time delay and integration;
a memory providing a pre-measured indication of non-linearity of the scanner and whose output is synchronized with the motion of the scanner;
means for varying the rate of time delay and integration of said elongate detector as a function of the non-linear scan velocity, thereby to compensate for the non-linearity of the optomechanical scanner.

15. Scanning apparatus comprising:
a non-linear optomechanical scanner receiving light from a scene and directing it onto an image plane, said scanner defining a non-linear scan velocity in the image plane;
a SPRITE detector disposed in said image plane and including first and second spaced contacts and means for applying a bias voltage across said contacts;
a memory providing a pre-measured indication of non-linearity of the scanner and whose output is synchronized with the motion of the scanner;
means for varying the bias voltage across said contacts as a function of the non-linear scan velocity, thereby to compensate for the non-linearity of the optomechanical scanner; and
wherein said apparatus is suitable for use for scanning in either of two opposite directions and includes means for selectably switching the polarity of the bias voltage across said contacts.

16. Apparatus according to claim 15 and also comprising means for selectably obtaining an output signal at a selected end of said SPRITE detector in accordance with the desired direction of scanning.

17. Apparatus according to claim 15 and wherein said means for varying comprises a buffer memory.

18. Apparatus according to claim 15 and wherein said means for varying comprises a feedback loop coupled to the scanner.

19. Scanning apparatus comprising:
a non-linear optomechanical scanner receiving light from a scene and directing it onto an image plane, said scanner defining a non-linear scan velocity in the image plane;
an elongate detector disposed in said image plane and including means for performing time delay and integration therealong and means for controlling the rate of time delay and integration;
a memory providing a pre-measured indication of non-linearity of the scanner and whose output is synchronized with the motion of the scanner;
means for varying the rate of time delay and integration of said elongate detector as a function of the non-linear scan velocity, thereby to compensate for the non-linearity of the optomechanical scanner, and
wherein said apparatus is suitable for use for scanning in either of two opposite directions.

20. Apparatus according to claim 19 and also comprising means for selectably obtaining an output signal at a selected end of said detector in accordance with the desired direction of scanning.

* * * * *